United States Patent
Centerwall et al.

(10) Patent No.: US 6,636,240 B1
(45) Date of Patent: *Oct. 21, 2003

(54) SYSTEM AND METHOD FOR BUILDING DYNAMIC E-MAIL DISTRIBUTION LISTS FROM MULTIPLE SELECTED DOCUMENTS

(75) Inventors: Brandt C. Centerwall, Chenango Forks, NY (US); James L. McGinniss, Jr., Little Meadows, PA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/464,887

(22) Filed: Dec. 16, 1999

(51) Int. Cl.[7] .................................................. G09G 5/00
(52) U.S. Cl. ...................... 345/752; 345/739; 345/789; 345/811; 345/733
(58) Field of Search ................................. 345/739, 752, 345/789, 811, 329, 333, 733, 762; 707/10; 709/232

(56) References Cited

U.S. PATENT DOCUMENTS

| | | | | |
|---|---|---|---|---|
| 5,424,724 A | | 6/1995 | Williams et al. | 340/825.05 |
| 5,657,461 A | * | 8/1997 | Harkins et al. | 345/333 |
| 5,761,415 A | | 6/1998 | Joseph et al. | 395/200.3 |
| 5,864,684 A | | 1/1999 | Nielsen | 395/200.36 |
| 5,878,230 A | | 3/1999 | Weber et al. | 395/200.68 |
| 5,892,909 A | | 4/1999 | Grasso et al. | 395/200.31 |
| 5,990,886 A | * | 11/1999 | Serdy et al. | 345/329 |
| 6,157,924 A | * | 12/2000 | Austin | 707/10 |
| 6,216,165 B1 | * | 4/2001 | Woltz et al. | 709/232 |
| 6,252,588 B1 | * | 6/2001 | Dawson | 345/329 |

* cited by examiner

Primary Examiner—Kristine Kincaid
Assistant Examiner—Mylinh Tran
(74) Attorney, Agent, or Firm—Shelley M Beckstrand

(57) ABSTRACT

A Lotus Notes agent populates an addressee field of a new memo with, or creates a new distribution list from, a plurality of E-mail addresses dynamically generated from a plurality of documents selected by a user from a list of received E-mail documents in a browser window or other view which is able to access an E-mail facility.

13 Claims, 3 Drawing Sheets

SYSTEM AND METHOD FOR BUILDING DYNAMIC E-MAIL DISTRIBUTION LISTS FROM MULTIPLE SELECTED DOCUMENTS

BACKGROUND OF THE INVENTION

1. Technical Field of the Invention

This invention pertains to electronic mail. More particularly, it relates to building dynamic distribution lists from multiple selected documents.

2. Background Art

In a network environment, such as in a Lotus Notes (TM) application, a database may contain many user profile documents, each containing information about an individual including an E-mail address. Periodic E-mail documents are sent to groups of individuals. It is characteristic of such groups, that membership constantly changes.

Current implementations of Notes and web browsers require that groups be predefined in an address book. The maintenance of a constantly changing group is time consuming and prone to error. Typical implementations of Notes and web browsers allow a reply or forward function. The user selects an E-mail document or Note, activates the reply function, and the addressee the reply document is automatically set to the originator of the original document or Note. However, if a plurality of documents or Notes is selected, then the reply function is inhibited, or "greyed out". In such a case, the user must manually enter each individual to receive the note, or select a predefined distribution list containing the group of addressees.

There is a need in the art for a method for allowing the dynamic selection of multiple addresses.

It is an object of the invention to provide an improved addressee function.

It is a further object of the invention to provide a method for dynamically generating an addressee list from a plurality of selected documents.

It is a further object of the invention to provide a method for automating the creation of a "send-to" field of a new memo from the selection of a plurality of documents.

It is a further object of the invention to provide a simplified method for sending mail to multiple users when a pre-defined group is not needed or desired.

It is a further object of the invention to minimize the need for pre-defining users and/or groups in an address book.

It is a further object of the invention to provide an improved method for enabling a user to reply to a plurality of selected E-mail documents in a browser.

SUMMARY OF THE INVENTION

In accordance with the invention, a method for generating an addressee list includes the steps responsive to user selection of a plurality of user profile documents of extracting the mail addresses from the selected documents and opening a new document containing the extracted addresses in the addressee field.

In accordance with an aspect of the invention, there is provided a computer program product configured to be operable to generate an address list dynamically from a plurality of selected documents.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
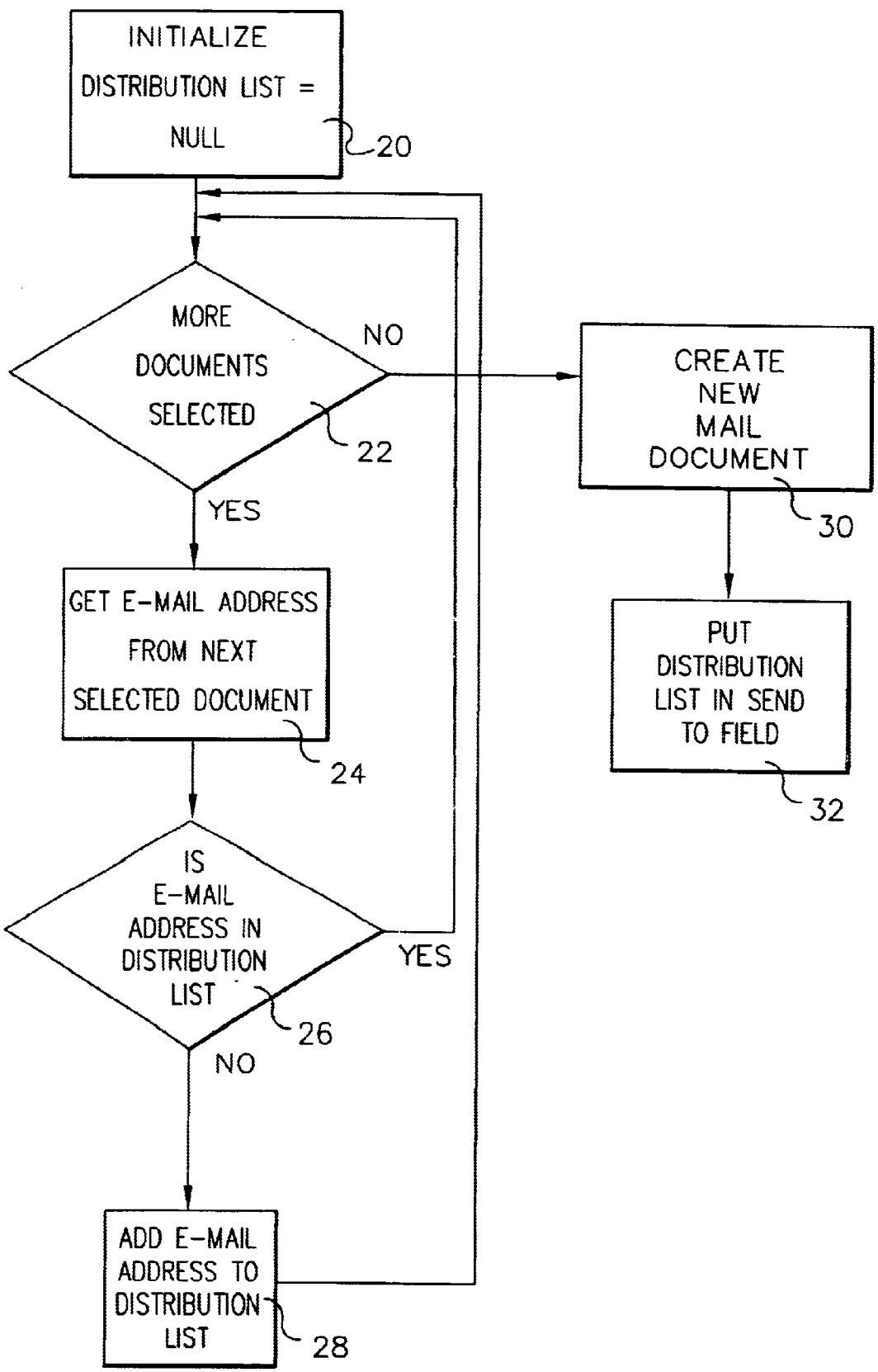
FIG. 1 is a flow chart representation of the method of the preferred embodiment of the invention.
Figure 2:
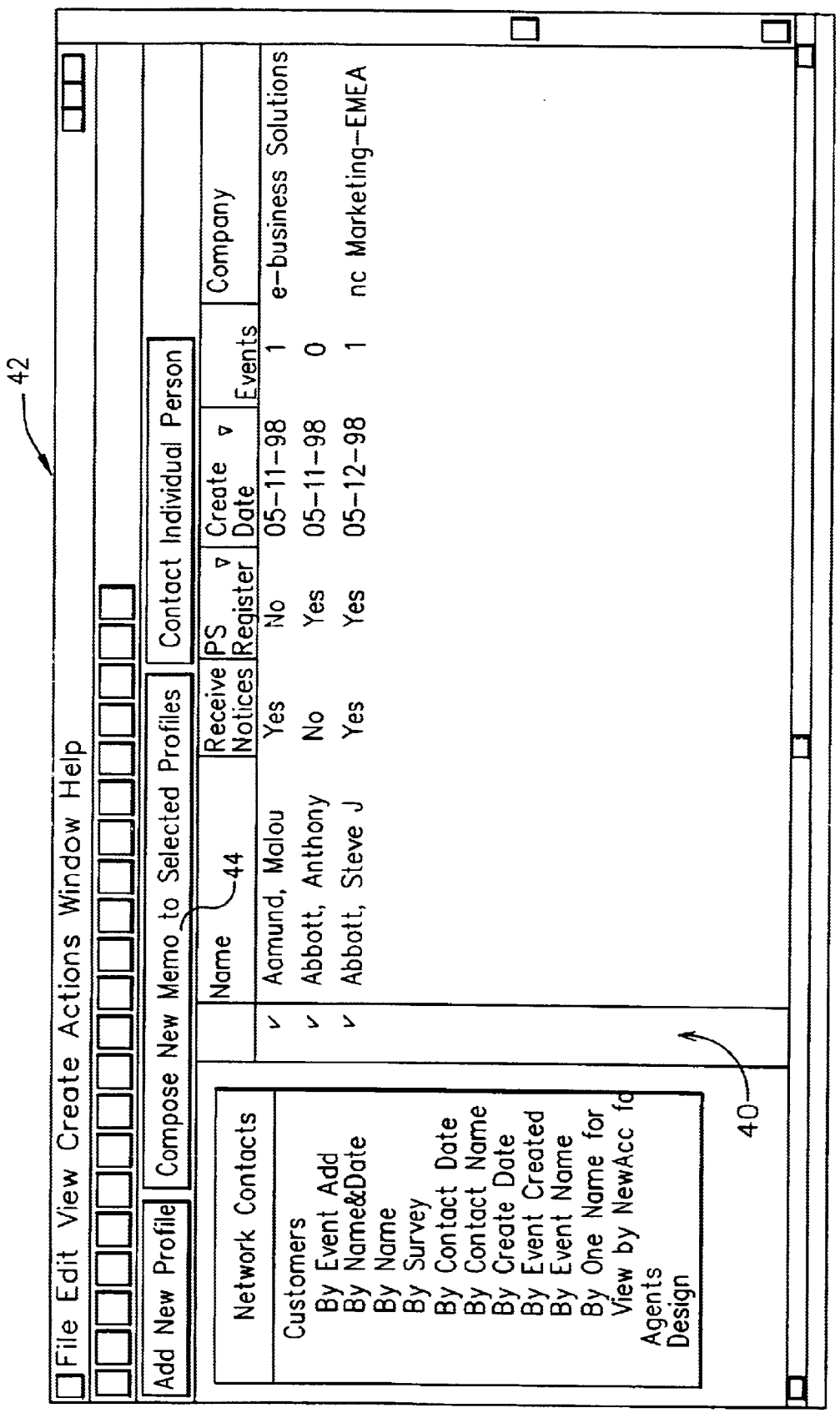
FIG. 2 is a screen capture representation of selection of multiple documents from a view and the Compose New Memo button activated to execute the preferred embodiment of the method of the invention.

Referring to FIGS. 1 and 2, in connection with the agent code of Table 1, the method of the preferred embodiment of the invention includes putting in an addressee field of new memo a plurality of E-mail addresses dynamically generated from a plurality of selected documents.

A user at a browser or some other view or window selection area 42 which is able to access an E-mail facility selects a plurality of documents 40, each of which contains a valid E-mail address, and then selects Compose New Memo to Selected Profiles button 44.

Responsive to the selection of button 44, in step 20 the dynamic distribution list agent of Table 1 begins execution by initializing a variable, Distribution List, used to hold the E-mail addresses, to NULL, or blank.

In step 22, a test is done to see if there are more documents 40 selected. If true, in step 24 the next document is processed by obtaining its E-mail address. If not, the new distribution list is complete for all selected documents 40, and processing continues at step 30.

In step 26, to avoid duplicate addresses, a test is done comparing the E-mail address obtained in step 24 against the E-mail addresses already in the variable Distribution List. If the E-mail address obtained in step 24 is not contained in Distribution List, in step 28 it is added, and processing continues back to step 22.

Figure 3:
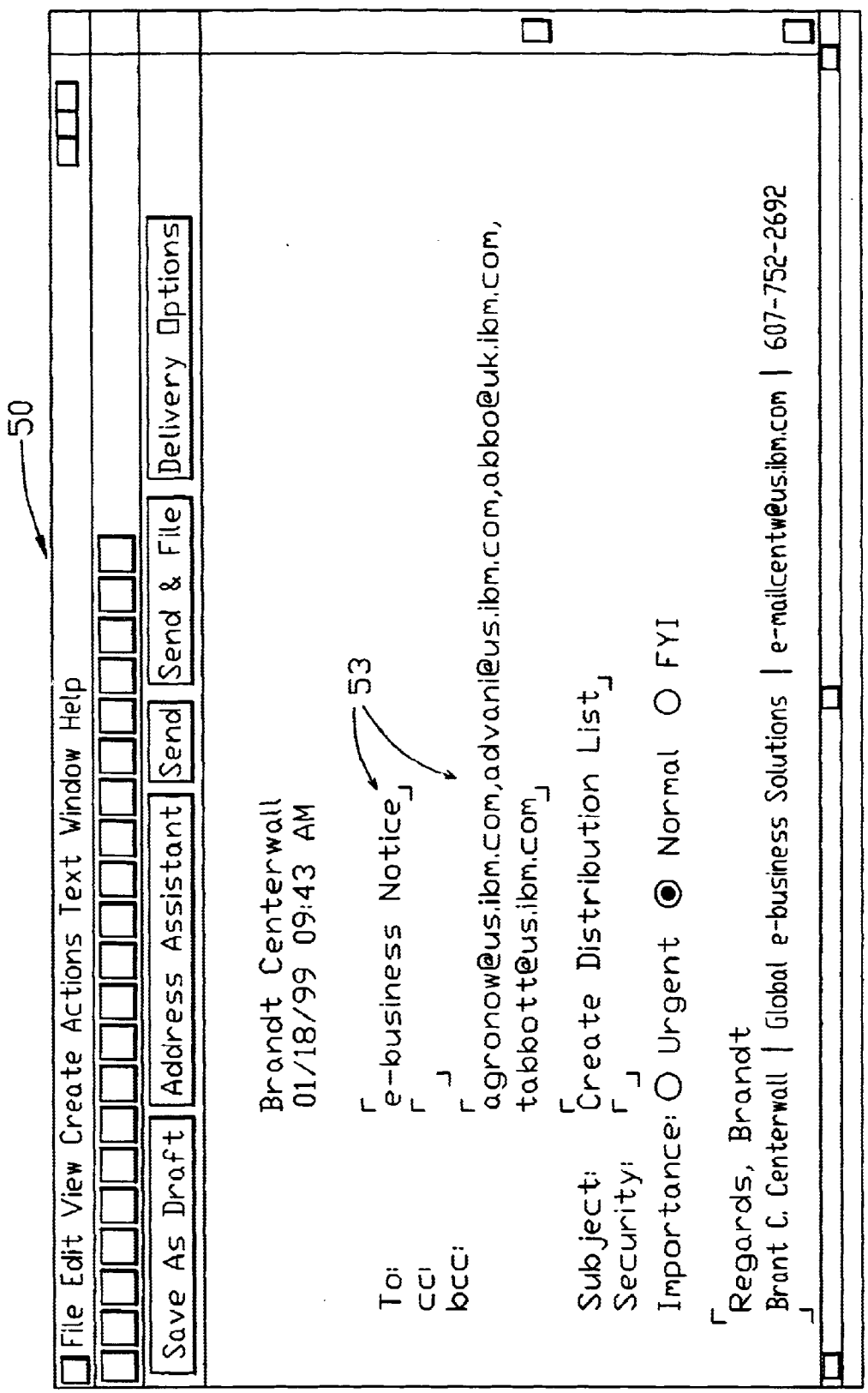
FIG. 3 is a screen capture representation of the new memo with a distribution list dynamically selected from a plurality of documents.

Referring to FIG. 1 in connection with FIG. 3, in step 30, the E-mail facility is opened to create a new mail document 50, and the value of the variable Distribution List 52 is put in the Send To field of the E-mail document 50.

A code implementation of a Lotus Notes agent, written in LotusScript, of the preferred embodiment of the invention is set forth in Table 1. This could also be used on a non-Notes application with modifications. The idea would be the same.

TABLE 1

AGENT CODE

```
Sub Initialize
    Dim session As New NotesSession
    Dim uiws As New NotesUIWorkspace
    Dim memoDoc As NotesUIDocument
    Dim distList As String
    Dim s As New NotesSession
    Dim mailDB As NotesDatabase
    Dim doc As NotesDocument
    Dim MailFileName As String
    Dim MailServerName As String
    Dim docList as NotesDocumentCollection
'Get the list of selected documents
    Set docList=s.CurrentDatabase.UnprocessedDocuments
    Set doc=docList.GetFirstDocument
'Loop through all the documents to create the distribution
' list
```

TABLE 1-continued

AGENT CODE

```
    Do Until doc is Nothing
'If not first person, append a comma
        If (distList<>"")Then distList=distList &","
        Dim tname As New NotesName(doc.From(0))
'Append e-mail address to the distribution list
        distList=distList & tname.Abbreviated
'Get the next document selected
        Set doc=docList.GetNextDocument(doc)
        Loop
'The following is coded for use in a Lotus Notes Mail
' environment
mailServerName=
        session.GetEnvironmentString("MailServer",True)
mailFileName=
        session.GetEnvironmentString("MailFile",True)
        Set mailDB=
                session.GetDatabase(mailServerName,mailFileName)
        'First try to open the primary mail database
        If Not mailDB.IsOpen Then
'Try to open a local replica.
' Assume it is in the Notes root directory and has the same
' filename as the server copy.
'This code removes the sub-directory from the filename
                Dim ids,tidx As Integer
'Get position of first backslash in filename
                idx=Instr(mailFileName, "\")
                tidx=idx
                While tidx<>0
                        idx=tidx
'Find next backslash. Assume the filename does not end with
' a backslash.
                        tidx=Instr(tidx+1,mailFileName, "\")
                Wend
'Get the filename
                If idx<>0 Then mailFileName=Mid(mailFileName,idx+1)
'Use local replica if main mail db not available
                mailServerName=""
                Set mailDB=
                        session.GetDatabase(mailServerName,mailFileName)
                If Not mailDB.IsOpen Then
                        Messagebox "Unable to open mail database.",48,"Error"
                        Exit Sub
                End If
        End If
        Call memoDoc.FieldSetText("SendTo",distList)
End Sub
```

In accordance with a further embodiment of the invention, the distribution list for the new document is saved for subsequent use in a database of distribution lists. This could be activated by providing a pop up list activated by selection of the Compose New Memo to Selected Profiles button when multiple profiles 40 have been marked which gives the user the option to Create Distribution List.

Advantages over the Prior Art

It is an advantage of the invention that there is provided an improved addressee function.

It is a further advantage that there is provided a method for dynamically generating an addressee list from a plurality of selected documents.

It is a further advantage that there is provided a method for automating the creation of a "send-to" field of a new memo from the selection of a plurality of documents.

It is a further advantage that there is provided a simplified method for sending mail to multiple users when a pre-defined group is not needed or desired.

It is a further advantage that there is provided method for minimizing the need for pre-defining users and/or groups in an address book.

It is a further advantage that there is provided an improved method for enabling a user to reply to a plurality of selected E-mail documents in a browser.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as LotusScript, C++, Java, Pl/1, FORTRAN or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for building a dynamic distribution list directly from received E-mail documents, comprising:

receiving a plurality of received E-mail documents, each said document including an E-mail address;

responsive to user selection of a plurality of selected documents from said plurality of received E-mail documents, extracting said E-mail addresses from said selected documents; and opening a new document containing said E-mail addresses extracted from said selected documents in said dynamic distribution list for sending said new document;

thereby building said dynamic distribution list without reference to a user or system administrator predefined database of approved or allowed addresses.

2. The method of claim 1, comprising the further steps of:

initializing an unprocessed document list containing a list of said plurality of received E-mail documents;

initializing a distribution list variable to null; and for each said selected document in said unprocessed document list, extracting said E-mail address from said unprocessed document list to said distribution list variable.

3. The method of claim 2, comprising the further step of selectively preparing a new distribution list or new mail document including said E-mail addresses from said distribution list variable.

4. A method for building a dynamic distribution list, comprising the steps of:

initializing a distribution list variable;

receiving at a user terminal from an external network a plurality of mail documents;

operating said user terminal to select a plurality of user selected documents from said plurality fo mail documents;

extracting mail addresses from each said user selected document, and loading said mail addresses to said distribution list variable; and preparing a new document including in said dynamic distribution list addresses loaded to said distribution list variable;

thereby building said dynamic distribution list without reference to a user or system administrator predefined database of approved or allowed addresses.

5. The method of claim 4, said receiving step comprising the further steps of:

displaying at a user browser at said user terminal a list of said mail documents; and detecting as said selected mail documents those documents from said list selected by said user.

6. The method of claim 5, said new document being a new mail document including said dynamic distribution list in an addressee field of said new mail document.

7. The method of claim 5, said new document being a new distribution list file.

8. The method of claim 5, further comprising the steps of:

displaying at said user browser selection indicia enabling said user to selectively choose create a new distribution list file option or a new mail document option;

responsive to user selection of said create new distribution list file option, creating a new distribution list file including said dynamic distribution list; and responsive to user selection of said new mail document option, creating a new mail document including said dynamic distribution list in an addressee field of said new mail document.

9. A system for building a dynamic distribution list for an E-Mail document, comprising:

a user terminal for receiving mail documents from an external network;

a user browser at said user terminal for selectively displaying information to and receiving selection input from a user; an agent; and said agent being operable for receiving from said user browser a list of selected mail documents selected by said user from a list of said mail documents;

extracting addressee indicia from each said selected mail document to a distribution list variable; and creating a new document including in said dynamic distribution list said addressee indicia;

thereby building said dynamic distribution list without reference to a user or system administrator predefined database of approved or allowed addresses.

10. The system of claim 9, said new document selectively being a new distribution list database or a new mail document.

11. A program storage device readable by a machine, tangibly embodying a program of instructions executable by a machine to perform method steps for building a dynamic distribution list, said method steps comprising:

receiving from an external communication network directly into a mail box a plurality of received E-mail documents, each said document including an E-mail address generated by a sender of said document;

responsive to user selection of a plurality of selected documents from said mail box, extracting said E-mail addresses from said selected documents; and opening a new document containing in said dynamic distribution list said E-mail addresses extracted from said selected list for sending said new document;

thereby building said dynamic distribution list without reference to a user or system administrator predefined database of approved or allowed addresses.

12. An article of manufacture comprising:

a computer useable medium having computer readable program code means embodied therein for building a dynamic distribution list, the computer readable program means in said article of manufacture comprising:

computer readable program code means for causing a computer to effect initializing a distribution list variable;

computer readable program code means for causing a computer to effect at a user terminal receiving from an external network a plurality of mail documents;

computer readable program code means for causing a computer to effect operating said user terminal to select a plurality of user selected documents from said plurality of mail documents;

computer readable program code means for causing a computer to effect extracting mail addresses from each said user selected document, and loading said mail addresses to said distribution list variable; and computer readable program code means for causing a computer to effect preparing a new document including in said dynamic distribution list mail addresses from said distribution list variable;

thereby building said dynamic distribution list without reference to a user or system administrator predefined database of approved or allowed addresses.

13. A computer program product or computer program element for building a dynamic distribution list according to the steps of:

receiving from a user browser a list of mail documents selected by said user from a mail box of E-mail documents received from an external communication network;

extracting addressee indicia from each mail document in said list directly to a distribution list variable; and creating a new document including in said dynamic distribution list said addressee indicia;

thereby building said dynamic distribution list from a mail box of external documents received at said user browser without reference to a user or system administrator predefined database of approved or allowed addressees.

* * * * *